United States Patent [19]

Matzinger

[11] Patent Number: 5,324,826
[45] Date of Patent: Jun. 28, 1994

[54] AZO DISPERSE DYES HAVING 1,2,4-TRIAZOL-5-YL DIAZO COMPONENT RADICALS HAVING ELECTRON-WITHDRAWING SUBSTITUENTS IN THE 3-POSITIONS

[75] Inventor: Peter Matzinger, Binningen, Switzerland

[73] Assignee: Sandoz Ltd., Basel, Switzerland

[21] Appl. No.: 927,900

[22] Filed: Aug. 10, 1992

[30] Foreign Application Priority Data

Aug. 12, 1991 [DE] Fed. Rep. of Germany ....... 4126591

[51] Int. Cl.$^5$ .................. C09B 29/036; C09B 29/08; C09B 29/36; D06P 00/00
[52] U.S. Cl. ................................... 534/794; 534/649; 534/753; 534/765; 534/766; 534/768; 534/769; 534/791
[58] Field of Search .............. 534/607, 610, 753, 765, 534/768, 766, 769, 791, 794

[56] References Cited

U.S. PATENT DOCUMENTS

| | | | |
|---|---|---|---|
| 3,369,856 | 2/1968 | Dehnert et al. | 534/753 X |
| 3,654,259 | 4/1972 | Iizuka et al. | 534/610 |
| 3,679,656 | 7/1972 | Iizuka et al. | 534/610 X |
| 4,039,539 | 8/1977 | Kuhlthau | 534/607 |
| 4,048,151 | 9/1977 | Henzi | 534/607 |
| 4,051,117 | 9/1977 | Kuhlthau et al. | 534/607 |
| 4,082,740 | 4/1978 | Mohr et al. | 534/607 |
| 4,111,929 | 9/1978 | Fawkes | 534/610 |
| 4,113,717 | 9/1978 | Parton | 534/610 |
| 4,218,369 | 8/1980 | Brouard et al. | 534/607 X |
| 4,236,013 | 11/1980 | Irick et al. | 548/261 |
| 4,251,440 | 2/1981 | Kaeppeli | 534/753 X |
| 4,341,700 | 7/1982 | Matzinger | 534/753 X |
| 4,619,991 | 10/1986 | Matzinger | 534/588 |

FOREIGN PATENT DOCUMENTS

| | | | |
|---|---|---|---|
| 51-18738 | 2/1976 | Japan | 534/607 |
| 51-18739 | 2/1976 | Japan | 534/610 |
| 51-23516 | 2/1976 | Japan | 534/607 |
| 51-23517 | 2/1976 | Japan | 534/610 |

OTHER PUBLICATIONS

Ohkawa et al., Chemical Abstracts, 80:28454b (1974).
March, Advanced Organic Chemistry, Third Edition, 1985, 16–18.

*Primary Examiner*—Mary C. Lee
*Assistant Examiner*—Fiona T. Powers
*Attorney, Agent, or Firm*—Robert S. Honor; Melvyn M. Kassenoff

[57] ABSTRACT

Compounds of the formula

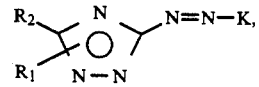

wherein
$R_1$ is $C_{1-18}$alkyl, substituted $C_{1-18}$alkyl, phenyl, substituted phenyl, $C_{3-6}$alkenyl, substituted $C_{3-6}$alkenyl, $C_{3-6}$alkynyl or substituted $C_{3-6}$alkynyl,
$R_2$ is an electron withdrawing substituent; and
K is the residue of a coupling component that is free of any water solubilizing groups.

The compounds are disperse dyes which can be used to dye, print or pad fully synthetic or semi-synthetic hydrophobic high molecular weight organic material.

20 Claims, No Drawings

AZO DISPERSE DYES HAVING 1,2,4-TRIAZOL-5-YL DIAZO COMPONENT RADICALS HAVING ELECTRON-WITHDRAWING SUBSTITUENTS IN THE 3-POSITIONS

According to the invention there is provided a compounds of formula I

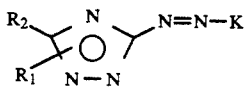

in which $R_1$ is selected from $C_{1-18}$alkyl, phenyl, $C_{2-6}$alkenyl and $C_{2-6}$alkynyl, each being unsubstituted or substituted;

$R_2$ is an electron-withdrawing substituent; and

K is the residue of a coupling component that is free of water-solubilizing groups.

The compounds of formula I are good disperse dyes and can be used to dye, print or pad fibers or threads or material formed from fibers or threads of fully synthetic or semisynthetic hydrophobic high molecular weight organic material.

Water-solubilizing groups include $-SO_3H$ and COOH.

The compounds of formula I are useful for transfer printing as described in U.S. Pat. Nos. 4,720,480 and 4,820,686 and EP 194,106.

$R_1$ is preferably $R_1'$ where $R_1'$ is $C_{1-4}$alkyl, unsubstituted or substituted by one to three (preferably one) groups selected from cyano, hydroxy, $C_{1-4}$alkoxycarbonyl, $C_{1-4}$alkylcarbonyl, $C_{1-4}$alkylcarbonyloxy, $C_{1-4}$alkoxycarbonyloxy, aminocarbonyl, $C_{1-4}$alkoxy, halogen, formyl and formyloxy;

$C_{2-6}$alkynyl or $C_{2-6}$alkenyl optionally substituted by halogen or a phenyl group; or phenyl, unsubstituted or substituted by one or two groups selected from halogen, $C_{1-4}$alkoxy, nitro or $C_{1-4}$alkoxycarbonyl; benzyl unsubstituted and substituted by 1 or 2 halogen.

More preferably $R_1$ is $R_1''$ where $R_1''$ is $C_{1-4}$alkyl, cyano-($C_{1-4}$alkyl), $C_{1-2}$alkoxycarbonylmethyl, allyl, chloroallyl, dinitrophenyl, benzyl or dichlorobenzyl. Most preferably $R_1$ is $R_1''$ where $R_1''$ is dichlorobenzyl.

Preferably $R_2$ is $R_2'$ where $R_2'$ is trifluoromethyl, halogen, monochloromethyl, monobromomethyl, dichloromethyl, dibromomethyl, trichloromethyl, tribromomethyl, formyl, aminocarbonyl, cyano, $C_{1-6}$alkylcarbonyl, $C_{1-6}$alkoxycarbonyl, carboxyl, $C_{2-6}$alkenyl bearing a phenyl, a $C_{1-6}$alkoxycarbonyl or a carboxyl group or $C_{2-6}$alkynyl bearing a phenyl, a $C_{1-6}$alkoxycarbonyl or a carboxyl group. More preferably $R_2$ is $R_2''$ where $R_2''$ is trifluoromethyl.

K is preferably K' where K' is a coupling component of the aniline, naphthylamine, naphthol, pyridine, pyridone, pyrazole, pyrazolone, pyrimidone, tetrahydroquinoline, benzomorpholine, pyrrole, coumarin, thiazole, indole, carbazole or oxazole series or the residue of a coupling component having an active methylene group.

More preferably K is K'' where K'' is a group of formula V

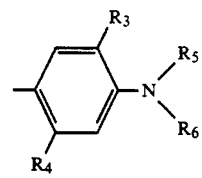

in which $R_3$ is hydrogen, $C_{1-4}$alkyl (preferably methyl or ethyl), $C_{1-4}$alkoxy (preferably methoxy or ethoxy) or halogen;

$R_4$ is hydrogen, $C_{1-4}$alkyl, $C_{1-4}$acyl (preferably $-CO-C_{1-4}$alkyl), benzoylamino, $C_{1-4}$alkylcarbonylamino, $C_{1-4}$alkoxycarbonylamino, $C_{1-4}$alkylsulphonylamino, acryloylamino, or $C_{3-4}$alkenylcarbonylamino, in which any alkyl group present in $R_4$ can be unsubstituted or substituted by one group selected from halogen, hydroxy, $C_{1-4}$alkoxy, phenyl and phenoxy;

$R_5$ is $C_{1-8}$alkyl, unsubstituted or substituted by one or two conventional substituent groups (such as cyano, halogen, hydroxy, $C_{1-4}$alkoxy, phenyl, $C_{1-4}$alkylcarbonyloxy, $C_{1-4}$alkoxycarbonyl, phenoxycarbonyl and phenoxy), $C_{3-8}$alkenyl, unsubstituted or substituted by halogen or phenyl, $C_{3-8}$alkynyl, unsubstituted or substituted by halogen or phenyl; cyclohexyl, unsubstituted or substituted by one to three $C_{1-4}$alkyl (preferably methyl) groups; or phenyl, unsubstituted or substituted by halogen, $C_{1-4}$alkyl (preferably methyl) or $C_{1-4}$alkoxy (preferably methoxy or ethoxy);

$R_6$ is hydrogen, $C_{1-8}$alkyl, unsubstituted or unsubstituted by one or two conventional substituent groups (preferably such conventional substituent groups are selected from halogen, cyano, hydroxy, $C_{1-4}$alkoxycarbonyl, $C_{1-4}$alkylcarbonyl, $C_{1-4}$alkylcarbonyloxy, $C_{1-4}$alkoxycarbonyloxy, aminocarbonyl, $C_{1-4}$alkoxy, halogen, formyl and formyloxy, $C_{3-8}$alkenyl, unsubstituted or substituted by halogen; or $C_{3-8}$alkynyl, unsubstituted or substituted by halogen; or $R_5$ and $R_6$ together with the N atom to which they are attached form a heterocyclic group.

Preferably $R_3$ is $R_3'$ where $R_3'$ is hydrogen, methyl or ethyl, more preferably hydrogen.

Preferably $R_4$ is $R_4'$ where $R_4'$ is hydrogen, methyl, $C_{1-2}$alkylcarbonylamino, acryloylamino, benzoylamino or $C_{1-2}$alkylsulphonylamino.

Preferably $R_5$ is $R_5'$ where $R_5'$ is selected from allyl, chloroallyl, $C_{1-4}$alkyl and $C_{2-4}$alkyl, substituted by one substituent selected from methoxy, ethoxy, $C_{1-2}$alkylcarbonyloxy, $C_{1-2}$alkoxycarbonyl, cyano and phenoxycarbonyl.

More preferably $R_5$ is $R_5''$ where $R_5''$ is selected from ethyl, cyanoethyl, acetoxyethyl, allyl and chloroallyl.

Preferably $R_6$ is $R_6'$ where $R_6'$ is selected from allyl, chloroallyl, $C_{1-4}$alkyl and $C_{2-4}$alkyl, substituted by one substituent selected from methoxy, ethoxy, $C_{1-2}$alkylcarbonyloxy, $C_{1-2}$alkoxycarbonyl and cyano.

More preferably $R_6$ is $R_6''$ where $R_6''$ is ethyl, cyanoethyl, acetoxyethyl or chloroallyl.

Compounds of formula I can be prepared by alkylating or arylating an azo compound of formula II

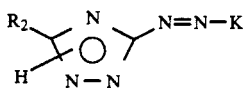

(II)

with an $R_1$-containing compound or with an alkylating or arylating agent which introduces an $R_1$ group.

Alkylation and arylation can be carried out by known methods. Known alkylating and arylating agents include $C_{1-18}$alkyl halides, $C_{1-18}$alkylsulphates, epoxides, α- and β-unsaturated compounds or (Di) nitrochlorobenzene.

The compounds of formula II can be made by diazotising one mole of an amine of formula III

(III)

and coupling with one mole of a coupling component of formula IV

H-K       (IV)

where the symbols are as defined above.

Compounds of formula I can be worked into dyeing preparations by known methods, for example by milling in the presence of a dispersing or filling agent. The preparations can be dried under vacuum or pulverized and can be used with much or little water to dye in short or long baths by exhaust dyeing padding or printing.

The dyes of formula I exhaust very well from aqueous suspensions and are suitable for coloring synthetic or semisynthetic, hydrophobic, high molecular weight textile material. Such textile material especially includes linear, aromatic polyester as well as cellulose 2½ acetate, cellulose triacetate and synthetic polyamide.

Dyeing can be carried out by known methods, for example in the process of GB Patent 1,114,433, the contents of which are incorporated herein by reference.

The resulting dyeings show good fastness properties, especially good light fastness properties, good thermofixation properties, good sublimation fastness properties and good blistering properties.

The dyes of the invention have good thermal transfer printing, good migration, good dyeing depth, good stability and good light fastness properties.

In this specification halogen is preferably fluoro, chloro, bromo or iodo, preferably chloro or bromo. Preferably any $C_{1-6}$alkyl or $C_{1-6}$alkyl groups are $C_{1-4}$alkyl or $C_{1-4}$alkoxy groups, respectively, more preferably methyl or ethyl or methoxy and ethoxy, respectively.

The invention will now be illustrated by the following example in which all parts and percentages are by weight and all temperatures are in °C. unless indicated to the contrary.

EXAMPLE 1

15.5 parts of trifluoromethyl-5-amino-1,2,4-triazole are dissolved in 45 parts of ortho phosphoric acid, are diazotised at $-5°$ with 35 parts of a 40% nitrosylsulphuric acid solution and are then stirred for 2 hours. Whilst maintaining the resulting diazonium solution at 0°, it is added slowly to a solution of 3-acetylamino-N,N-diethylaminobenzene in 200 parts of dilute hydrochloric acid (also kept cool at 0°). The resulting azo compound precipitates out by the addition of 30% sodium hydroxide and ice, after which the mixture is filtered and washed to be acid free.

23 parts of the resulting dried compound are suspended in 100 parts of acetone, reacted with 5 parts of potassium carbonate and 6.5 parts of benzyl chloride and boiled for 3 hours under reflux. After cooling to room temperature, the resultant dyestuff precipitates out, is filtered washed salt free and dried.

The compound of formula Ia results

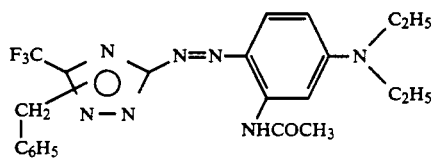

EXAMPLES 2–64

Compounds of the formula

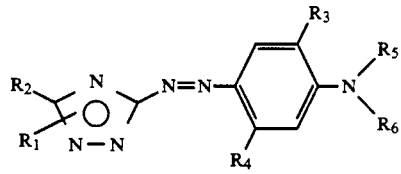

in which $R_1$ to $R_6$ are defined in Table 1 below can be made by a method analogous to that of Example 1 from known compounds. The compounds of Examples 1 to 64 dye polyester a yellow to reddish-yellow tone.

Any $C_2H_4$ group in the Examples is —$CH_2CH_2$—.
Any —OCO— radical is a —O—CO— radical.

The compounds of Examples 1 to 88 are single compounds not mixtures, but the position of $R_1$ was not clarified.

TABLE I

| Ex. No. | $R_1$ | $R_2$ | $R_3$ | $R_4$ | $R_5$ | $R_6$ | $\lambda_{max}$.nm |
|---|---|---|---|---|---|---|---|
| 1 | —$CH_2C_6H_5$ | —$CF_3$ | H | —$NHCOCH_3$ | —$C_2H_5$ | —$C_2H_5$ | 498 |
| 2 | " | " | —$OC_2H_5$ | " | —$CH_2CH=CH_2$ | —$CH_2CH=CH_2$ | 527 |
| 3 | -n-$C_4H_9$ | " | " | " | " | " | 518 |
| 4 | —$CH_2CH=CHCl$ | " | " | " | " | " | 525 |
| 5 | —$CH_2CN$ | " | H | " | —$C_2H_5$ | —$C_2H_5$ | 504 |
| 6 | —$CH_2CO_2CH_3$ | " | H | " | —$C_2H_4OCH_3$ | —$C_2H_4OCH_3$ | 500 |
| 7 | 2,4-Dichloro-benzyl | " | H | " | " | " | 498 |
| 8 | " | " | H | " | —$C_2H_5$ | —$C_2H_5$ | 502 |
| 9 | " | —Cl | H | " | " | " | 499 |
| 10 | —$CH_2C_6H_5$ | —$CHCl_2$ | H | " | " | " | 490 |
| 11 | " | —$CH_2Cl$ | H | " | —$C_3H_7(n)$ | —$C_3H_7(n)$ | 485 |
| 12 | " | —CHO | H | " | —$C_2H_5$ | —$C_2H_5$ | 500 |

TABLE I-continued

| Ex. No. | $R_1$ | $R_2$ | $R_3$ | $R_4$ | $R_5$ | $R_6$ | $\lambda_{max}$ nm |
|---|---|---|---|---|---|---|---|
| 13 | " | " | H | —$CH_3$ | " | " | 491 |
| 14 | " | —CN | H | —$NHCOCH_3$ | " | " | 512 |
| 15 | " | " | H | " | —$C_2H_4OCOCH_3$ | —$C_2H_4OCOCH_3$ | 505 |
| 16 | " | —CHO | H | " | —$CH_2CH=CH_2$ | —$C_2H_4OCH_3$ | 496 |
| 17 | " | " | H | " | " | —$C_2H_4CN$ | 488 |
| 18 | " | " | H | —$NHCOC_6H_5$ | —$C_2H_5$ | —$C_2H_5$ | 502 |
| 19 | " | " | H | —$NHCOCH=CH_2$ | " | " | 505 |
| 20 | " | —CN | H | —$NHSO_2CH_3$ | " | " | 510 |
| 21 | " | —$CONH_2$ | H | —$NHCOC_2H_5$ | —$CH_2CH=CHCl$ | —$C_2H_4OCH_3$ | 493 |
| 22 | " | —COOH | H | —$NHCOCH_3$ | —$C_2H_5$ | —$C_2H_5$ | 498 |
| 23 | " | —CH=CH—COOH | H | " | " | " | — |
| 24 | " | —CH=CH—$C_6H_5$ | H | " | " | " | — |
| 25 | 2,4-Dinitrophenyl | —$CF_3$ | H | —$NHCOCH_3$ | —$C_2H_5$ | —$C_2H_5$ | 510 |
| 26 | —$CH_2CH_2$—CN | " | H | " | " | " | 503 |
| 27 | —$CH_2C_6H_5$ | " | H | —$CH_3$ | " | " | 490 |
| 28 | " | " | H | H | " | " | 485 |
| 29 | " | " | H | —$NHCOCH_3$ | —$C_2H_4OCOCH_3$ | —$C_2H_4CN$ | 484 |
| 30 | " | " | H | " | " | —$C_2H_4OCOCH_3$ | 490 |
| 31 | " | " | H | H | —$C_2H_4CN$ | " | 467 |
| 32 | " | " | H | —$CH_3$ | " | " | 476 |
| 33 | " | " | H | H | —$C_2H_4OCOCH_3$ | " | 478 |
| 34 | " | " | H | H | —$C_2H_4CO_2C_2H_5$ | —$C_2H_4CO_2C_2H_5$ | 477 |
| 35 | 2,4-Dichlorobenzyl | " | H | —$CH_3$ | —$C_2H_5$ | —$C_2H_5$ | 494 |
| 36 | " | " | H | H | " | " | 488 |
| 37 | " | " | H | —$NHCOCH_3$ | —$C_2H_4OCOCH_3$ | —$C_2H_4CN$ | 486 |
| 38 | " | " | H | " | " | —$C_2H_4OCOCH_3$ | 494 |
| 39 | " | " | H | H | —$C_2H_4CN$ | " | 469 |
| 40 | " | " | H | —$CH_3$ | " | " | 478 |
| 41 | " | " | H | H | —$C_2H_4OCOCH_3$ | " | 482 |
| 42 | " | " | H | H | —$C_2H_4CO_2C_2H_5$ | —$C_2H_4CO_2C_2H_5$ | 481 |
| 43 | —$CH_2CH=CHCl$ | " | H | —$CH_3$ | —$C_2H_4OCOCH_3$ | —$C_2H_4CN$ | 474 |
| 44 | " | " | H | H | " | " | 466 |
| 45 | " | " | H | —$NHCOCH_3$ | " | " | 483 |
| 46 | " | " | H | H | —$C_2H_4CO_2C_2H_5$ | —$C_2H_4CO_2C_2H_5$ | 478 |
| 47 | 2,4-Dichlorobenzyl | " | H | —$NHCOCH_3$ | —$CH_2CH=CH_2$ | —$C_2H_4OCH_3$ | 494 |
| 48 | —$CH_2CH_2CN$ | —$CF_3$ | H | —$CH_3$ | —$C_2H_4OCOCH_3$ | —$C_2H_4CN$ | 477 |
| 49 | " | " | H | H | " | " | 468 |
| 50 | " | " | H | —$NHCOCH_3$ | " | " | 486 |
| 51 | " | " | H | H | —$C_2H_4CO_2C_2H_5$ | " | 485 |
| 52 | " | " | H | —$NHCOCH_3$ | —$CH_2CH=CH_2$ | —$C_2H_4OCH_3$ | 496 |
| 53 | —$CH_2C_6H_5$ | " | H | —$CH_3$ | —$CH_2$—CH=CHCl | —$C_2H_4CN$ | 476 |
| 54 | " | " | H | H | " | " | 467 |
| 55 | " | " | H | $NHCOCH_3$ | " | " | 484 |
| 56 | 2,4-Dichlorobenzyl | " | H | " | " | " | 487 |
| 57 | " | " | H | —$CH_3$ | " | " | 478 |
| 58 | " | " | H | H | —$C_2H_5$ | " | 479 |
| 59 | " | " | H | —$CH_3$ | —$CH_2$—CH=CHCl | —$CH_2CH=CHCl$ | 482 |
| 60 | " | " | H | —$NHCOCH_3$ | " | " | 490 |
| 61 | " | " | H | H | " | " | 474 |
| 62 | —$CH_2C_6H_5$ | " | H | —$NHCOCH_3$ | " | " | 488 |
| 63 | 2,4-Dichlorobenzyl | " | H | " | " | —$C_2H_5$ | 495 |
| 64 | " | " | H | " | " | —$C_2H_4OCOCH_3$ | 491 |

EXAMPLES 64–88

Compounds of the formula

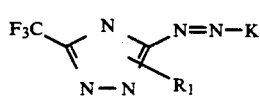

in which $R_1$ and K are defined in Table 2 below can be prepared by a method analogous to that of Example 1 from known compounds. The dyeings using the compounds of Examples 64–88 colour polyester a yellow to light reddish-yellow tone.

TABLE II

| Ex. No. | $R_1$ | K (coupling component radical) | $\lambda_{max}$ |
|---|---|---|---|
| 65 | —$CH_2C_6H_5$ | 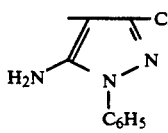 | 413 |
| 66 | " | 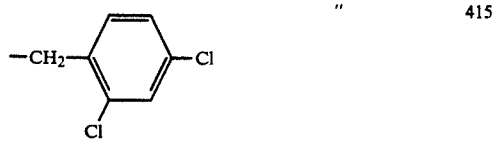 | 415 | where the K radical in Example 66 is —$CH_2$— attached to a 2,4-dichlorophenyl group.

TABLE II-continued
| Ex. No. | R₁ | K (coupling component radical) | $\lambda_{max}$ |
|---|---|---|---|
| 67 | " | 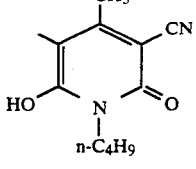 | 440 |
| 68 | " | 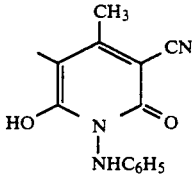 | 445 |
| 69 | —CH₂C₆H₅ | 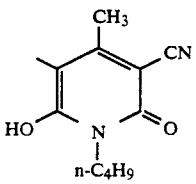 | 436 |
| 70 | —CH₂C₆H₅ | 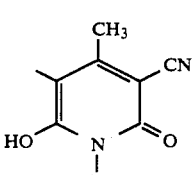 | 491 |
| 71 | " | 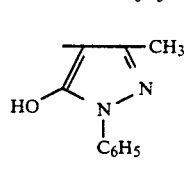 | 431 |
| 72 | 2,4-Dichlorobenzyl | " | 434 |
| 73 | —CH₂CH=CHCl | 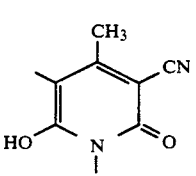 | 434 |
| 74 | " | 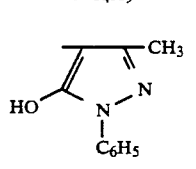 | 428 |
| 75 | " | 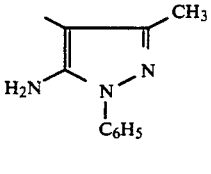 | 411 |
| 76 | —CH₂CH₂CN | 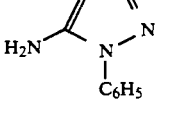 | 412 |
| 77 | —CH₂CN | 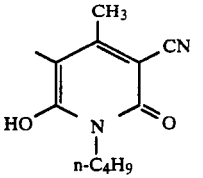 | 442 |
| 78 | —CH₂CH₂CN | " | 439 |
| 79 | 2,4-Dichlorobenzyl | 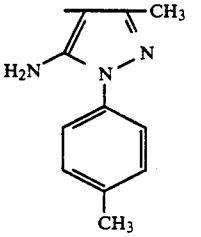 | 418 |
| 80 | " | 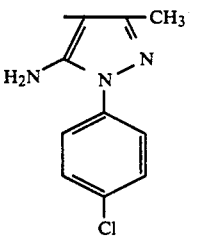 | 410 |
| 81 | 2,4-Dichlorobenzyl | 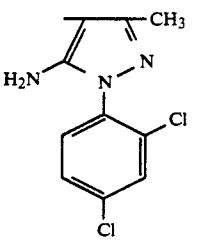 | 410 |
| 82 | —CH₂C₆H₅ | 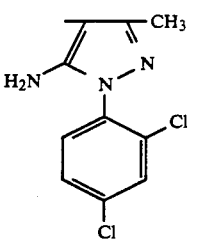 | 406 |
| 83 | " | 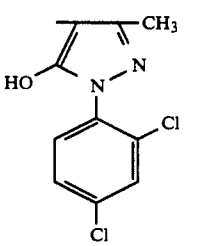 | 430 |

TABLE II-continued

| Ex. No. | R₁ | K (coupling component radical) | $\lambda_{max}$ |
|---|---|---|---|
| 84 | 2,4-Dichlorobenzyl | [structure with CH₃, CN, HO, N, O, (CH₂)₃OCH₃] | 438 |
| 85 | 2,4-Dichlorobenzyl | [pyrazole structure with CH₃, HO, N-N, p-NO₂-phenyl] | 425 |
| 86 | " | [pyrazole structure with CH₃, H₂N, N-N, p-NO₂-phenyl] | 405 |
| 87 | —CH₂C₆H₅ | " | 403 |
| 88 | " | [structure with CH₃, CN, HO, N, O, (CH₂)₃OCH₃] | 435 |

Application Example 7 parts of the dyestuff of Example 1 (Compound 1a) is milled with 13 parts of sodium ligninsulphonate, 25 parts of water and 100 parts of silica quartz beads until the particle size of the dyestuff is on average less than 1 μm. The silica beads are then filtered off from the suspension and the remaining suspension is dried under mild conditions and then pulverised. 1 part of the resulting preparation is stirred into 4000 parts of warm (60°) water buffered at pH 5. With this dyebath, 100 parts of polyester fibre material is dyed with the addition of 20 parts of o-phenylphenol for 1 hour at 98°. After cooling, washing, soaping, and washing and drying a second time, a level reddish-yellow dyeing results with good dyeing properties.

The Application Example can be repeated using, instead of compound 1a, 7 parts of any one of the dyes of Examples 2 to 88.

I claim:

1. A compound of the formula

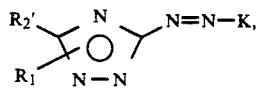

wherein

K is a coupling component radical free of water-solubilizing groups,

R₁ is $C_{1-18}$alkyl, substituted $C_{1-18}$alkyl, phenyl, substituted phenyl, $C_{2-6}$alkenyl, substituted $C_{3-6}$alkenyl, $C_{2-6}$alkynyl or substituted $C_{3-6}$alkynyl, and R₂' is halo; chloromethyl; bromomethyl; dichloromethyl; dibromomethyl; trifluoromethyl; trichloromethyl; tribromomethyl; cyano; aminocarbonyl; formyl; ($C_{1-6}$alkyl)carbonyl; ($C_{1-6}$alkoxy)carbonyl; $C_{2-6}$alkenyl monosubstituted by phenyl, ($C_{1-6}$alkoxy)carbonyl or carboxy; or $C_{2-6}$alkynyl monosubstituted by phenyl, ($C_{1-6}$alkoxy)carbonyl or carboxy.

2. A compound according to claim 1 wherein R₁ is $C_{1-4}$alkyl; $C_{1-4}$alkyl substituted by one to three substituents selected from cyano, hydroxy, ($C_{1-4}$alkoxy)carbonyl, ($C_{1-4}$alkyl)carbonyl, ($C_{1-4}$alkyl)carbonyloxy, ($C_{1-4}$alkoxy)carbonyloxy, aminocarbonyl, $C_{1-4}$alkoxy, halo, formyl and formyloxy; $C_{2-6}$alkenyl; $C_{2-6}$alkenyl monosubstituted by halo or phenyl; $C_{2-6}$alkynyl; $C_{2-6}$alkynyl monosubstituted by halo or phenyl; phenyl; phenyl substituted by one or two substituents selected from halo, $C_{1-4}$alkoxy, nitro and ($C_{1-4}$alkoxy)carbonyl; benzyl or benzyl monosubstituted or disubstituted by halo.

3. A compound according to claim 2 wherein R₂' is trifluoromethyl.

4. A compound according to claim 2 wherein R₁ is $C_{1-4}$alkyl, cyano($C_{1-4}$alkyl), ($C_{1-2}$alkoxy)carbonylmethyl, allyl, chloroallyl, dinitrophenyl, benzyl or dichlorobenzyl.

5. A compound according to claim 4 wherein R₂' is trifluoromethyl.

6. A compound according to claim 2 wherein K is a coupling component radical of the aniline, naphthylamine, naphthol, pyridine, pyridone, pyrazole, pyrazolone, pyrimidone, tetrahydroquinoline, benzomorpholine, pyrrole, coumarin, thiazole, indole, carbazole or oxazole series or the residue of a coupling component having an active methylene radical.

7. A compound according to claim 6 wherein K is

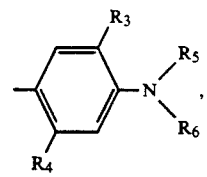

wherein

R₃ is hydrogen, $C_{1-4}$alkyl, $C_{1-4}$alkoxy or halo,

R₄ is hydrogen; $C_{1-4}$alkyl; $C_{1-4}$alkyl monosubstituted by halo, hydroxy, $C_{1-4}$alkoxy, phenyl or phenoxy; $C_{1-4}$acyl; $C_{1-4}$acyl an alkyl moiety of which is monosubstituted by $C_{1-4}$alkoxy, phenyl or phenoxy; benzoylamino; ($C_{1-4}$alkyl)carbonylamino; ($C_{1-4}$alkyl)carbonylamino the alkyl moiety of which is monosubstituted by halo, hydroxy, $C_{1-4}$alkoxy, phenyl or phenoxy; ($C_{1-4}$alkoxy)carbonylamino; ($C_{1-4}$alkoxy)carbonylamino the alkyl moiety of which is monosubstituted by halo, hydroxy, $C_{1-4}$alkoxy, phenyl or phenoxy; $C_{1-4}$alkylsulfonylamino; $C_{1-4}$alkylsulfonylamino the alkyl moiety of which is monosubstituted by halo, hydroxy, $C_{1-4}$alkoxy, phenyl or phenoxy; acryloylamino; ($C_{3-4}$alkenyl)carbonylamino or ($C_{3-4}$alkenyl)carbonylamino the alkyl moiety of which is monosubstituted by halo, hydroxy, $C_{1-4}$alkoxy, phenyl or phenoxy, $R_5$ is $C_{1-8}$alkyl; $C_{1-8}$alkyl substituted by one or two substituents; $C_{3-8}$alkenyl; $C_{3-8}$alkenyl substituted by halo or phenyl; $C_{3-8}$alkynyl; $C_{3-8}$alkynyl substituted by halo or phenyl; cyclohexyl; cyclohexyl substituted by one to three $C_{1-4}$alkyl groups; phenyl or phenyl substituted by halo, $C_{1-4}$alkyl or $C_{1-4}$alkoxy, and $R_6$ is hydrogen; $C_{1-8}$alkyl; $C_{1-8}$alkyl substituted by one or two substituents; $C_{3-8}$alkenyl; $C_{3-8}$alkenyl substituted by halo; $C_{3-8}$alkynyl or $C_{3-8}$alkynyl substituted by halo or $-NR_5R_6$ is a heterocyclic group.

8. A compound according to claim 7 wherein $R_4$ is hydrogen; $C_{1-4}$alkyl; $C_{1-4}$alkyl monosubstituted by halo, hydroxy, $C_{1-4}$alkoxy, phenyl or phenoxy; ($C_{1-4}$alkyl)carbonyl; ($C_{1-4}$alkyl)carbonyl the alkyl moiety of which is monosubstituted by halo, hydroxy, $C_{1-4}$alkoxy, phenyl or phenoxy; benzoylamino; ($C_{1-4}$alkyl)carbonylamino; ($C_{1-4}$alkyl)carbonylamino the alkyl moiety of which is monosubstituted by halo, hydroxy, $C_{1-4}$alkoxy, phenyl or phenoxy; ($C_{1-4}$alkoxy)carbonylamino; ($C_{1-4}$alkoxy)carbonylamino the alkyl moiety of which is monosubstituted by halo, hydroxy, $C_{1-4}$alkoxy, phenyl or phenoxy; $C_{1-4}$alkylsulfonylamino; $C_{1-4}$alkylsulfonylamino the alkyl moiety of which is monosubstituted by halo, hydroxy, $C_{1-4}$alkoxy, phenyl or phenoxy; acryloylamino; ($C_{3-4}$alkenyl)carbonylamino or ($C_{3-4}$alkenyl)carbonylamino the alkyl moiety of which is monosubstituted by halo, hydroxy, $C_{1-4}$alkoxy, phenyl or phenoxy, $R_5$ is $C_{1-8}$alkyl; $C_{1-8}$alkyl substituted by one or two substituents selected from cyano, halo, hydroxy, $C_{1-4}$alkoxy, phenyl, ($C_{1-4}$alkyl)carbonyloxy, ($C_{1-4}$alkoxy)carbonyl, phenoxycarbonyl and phenoxy; $C_{3-8}$alkenyl; $C_{3-8}$alkenyl substituted by halo or phenyl; $C_{3-8}$alkynyl; $C_{3-8}$alkynyl substituted by halo or phenyl; cyclohexyl; cyclohexyl substituted by one to three $C_{1-4}$alkyl groups; phenyl or phenyl substituted by halo, $C_{1-4}$alkyl or $C_{1-4}$alkoxy, and $R_6$ is hydrogen; $C_{1-8}$alkyl; $C_{1-8}$alkyl substituted by one or two substituents selected from halo, cyano, hydroxy, ($C_{1-4}$alkoxy)carbonyl, ($C_{1-4}$alkyl)carbonyl, ($C_{1-4}$alkyl)carbonyloxy, ($C_{1-4}$alkoxy)carbonyloxy, aminocarbonyl, $C_{1-4}$alkoxy, halo, formyl and formyloxy; $C_{3-8}$alkenyl; $C_{3-8}$alkenyl substituted by halo; $C_{3-8}$alkynyl or $C_{3-8}$alkynyl substituted by halo.

9. A compound according to claim 8 wherein $R_2'$ is trifluoromethyl.

10. A compound according to claim 8 wherein $R_1$ is $C_{1-4}$alkyl, cyano($C_{1-4}$alkyl), ($C_{1-2}$alkoxy)carbonylmethyl, allyl, chloroallyl, dinitrophenyl, benzyl or dichlorobenzyl.

11. A compound according to claim 10 wherein $R_2'$ is trifluoromethyl.

12. A compound according to claim 8 wherein $R_3$ is hydrogen, methyl, ethyl, methoxy, ethoxy or halo, and $R_5$ is $C_{1-8}$alkyl; $C_{1-8}$alkyl substituted by one or two substituents selected from cyano, halo, hydroxy, $C_{1-4}$alkoxy, phenyl, ($C_{1-4}$alkyl)carbonyloxy, ($C_{1-4}$alkoxy)carbonyl, phenoxycarbonyl and phenoxy; $C_{3-8}$alkenyl; $C_{3-8}$alkenyl substituted by halo or phenyl; $C_{3-8}$alkynyl; $C_{3-8}$alkynyl substituted by halo or phenyl; cyclohexyl; cyclohexyl substituted by one to three methyl groups; phenyl or phenyl substituted by halo, methyl, methoxy or ethoxy.

13. A compound according to claim 12 wherein $R_3$ is hydrogen, methyl or ethyl, $R_4$ is hydrogen, methyl, ($C_{1-2}$alkyl)carbonylamino, acryloylamino, benzoylamino or $C_{1-2}$alkylsulfonylamino, $R_5$ is allyl, chloroallyl, $C_{1-4}$alkyl or $C_{2-4}$alkyl monosubstituted by methoxy, ethoxy, ($C_{1-2}$alkyl)carbonyloxy, ($C_{1-2}$alkoxy)carbonyl, cyano or phenoxycarbonyl, and $R_6$ is allyl, chloroallyl, $C_{1-4}$alkyl or $C_{2-4}$alkyl monosubstituted by methoxy, ethoxy, ($C_{1-2}$alkyl)carbonyloxy, ($C_{1-2}$alkoxy)carbonyl or cyano.

14. A compound according to claim 13 wherein $R_5$ is ethyl, cyanoethyl, acetoxyethyl, allyl or chloroallyl, and $R_6$ is ethyl, cyanoethyl, acetoxyethyl or chloroallyl.

15. A compound according to claim 14 wherein $R_5$ is ethyl, 2-cyanoethyl, 2-acetoxyethyl, allyl or 3-chloroallyl, and $R_6$ is ethyl, 2-cyanoethyl, 2-acetoxyethyl or 3-chloroallyl.

16. A compound according to claim 15 wherein $R_1$ is $C_{1-4}$alkyl, cyano($C_{1-4}$alkyl), ($C_{1-2}$alkoxy)carbonylmethyl, allyl, chloroallyl, dinitrophenyl, benzyl or dichlorobenzyl.

17. A compound according to claim 16 wherein $R'_2$ is trifluoromethyl.

18. A compound according to claim 17 having the formula

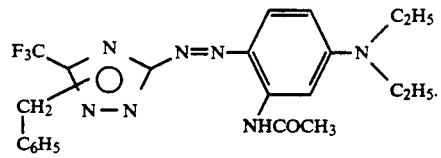

19. A process for dyeing a fully synthetic or semi-synthetic high molecular weight organic substrate comprising applying a compound according to claim 1 to a fully synthetic or semi-synthetic high molecular weight organic substrate, said substrate being fibers or threads or a material formed therefrom.

20. A fully synthetic or semi-synthetic high molecular weight organic substrate to which a compound according to claim 1 has been applied, said substrate being fibers or threads or a material formed therefrom.

* * * * *